United States Patent
Chang et al.

(10) Patent No.: US 10,678,215 B2
(45) Date of Patent: Jun. 9, 2020

(54) THREE DIMENSIONAL PRINTING METHOD AND THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yu-Chuan Chang, New Taipei (TW); Hsin-Ta Hsieh, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 598 days.

(21) Appl. No.: 14/711,783

(22) Filed: May 14, 2015

(65) Prior Publication Data
US 2016/0266572 A1 Sep. 15, 2016

(30) Foreign Application Priority Data
Mar. 13, 2015 (CN) .......................... 2015 1 0111217

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 64/386* (2017.08); *B33Y 50/00* (2014.12); *B33Y 50/02* (2014.12); *G05B 2219/49023* (2013.01)

(58) Field of Classification Search
CPC .... G05B 19/4099; B33Y 50/00; B33Y 50/02; B29C 67/0088
See application file for complete search history.

(56) References Cited

U.S. PATENT DOCUMENTS

| 6,259,962 B1 | 7/2001 | Gothait |
| 2004/0183796 A1 | 9/2004 | Velde et al. |

(Continued)

FOREIGN PATENT DOCUMENTS

| CN | 103009631 | 4/2013 |
| CN | 104044271 | 9/2014 |

(Continued)

OTHER PUBLICATIONS

"Office Action of Korean Counterpart Application," dated Apr. 10, 2017, with English translation thereof, p. 1-p. 10.
(Continued)

*Primary Examiner* — Jacob T Minskey
*Assistant Examiner* — Melody Tsui
(74) *Attorney, Agent, or Firm* — JCIPRNET

(57) ABSTRACT

A three dimensional printing method and a three dimensional printing apparatus are provided. Layer information of a three dimensional object is obtained, wherein the three dimensional object includes at least one layer object and the layer information includes a plurality of coordinate point locations of the at least one layer object. A geometry parameter is calculated according to the coordinate point locations, and whether the layer object includes at least one small-area object is determined according to the geometry parameter. If the layer object includes the at least one small-area object, a feed-material output amount associated with the small-area object is reduced. A printing module is controlled to print the small-area object according to the reduced feed-material output amount.

13 Claims, 3 Drawing Sheets

(51) Int. Cl.
　　　*B33Y 50/00*　　　(2015.01)
　　　*B29C 64/386*　　　(2017.01)

(56) References Cited

U.S. PATENT DOCUMENTS

| | | | | |
|---|---|---|---|---|
| 2010/0121476 | A1* | 5/2010 | Kritchman | G05B 19/41885 700/119 |
| 2014/0309764 | A1* | 10/2014 | Socha-Leialoha | H04N 13/239 700/119 |
| 2016/0151979 | A1* | 6/2016 | Urban | B33Y 50/00 264/308 |

FOREIGN PATENT DOCUMENTS

| | | | |
|---|---|---|---|
| CN | 104044271 A | * | 9/2014 |
| CN | 104275798 | | 1/2015 |
| CN | 104044271 B | * | 1/2017 |
| JP | 2004230895 | | 8/2004 |

OTHER PUBLICATIONS

"Office Action of China Counterpart Application," dated Nov. 27, 2017, p. 1-p. 9.

* cited by examiner

THREE DIMENSIONAL PRINTING METHOD AND THREE DIMENSIONAL PRINTING APPARATUS

CROSS-REFERENCE TO RELATED APPLICATION

This application claims the priority benefit of China application serial no. 201510111217.4, filed on Mar. 13, 2015. The entirety of the above-mentioned patent application is hereby incorporated by reference herein and made a part of this specification.

BACKGROUND

Technical Field

The technical field relates to a printing apparatus and a printing method and more particularly relates to a three dimensional printing method and a three dimensional printing apparatus.

Description of Related Art

In recent years, with the increasing development of technology, many different methods of using additive manufacturing technology such as layer-by-layer construction model, etc. to build physical three dimensional (3D) models have been proposed. Generally, additive manufacturing technology converts design data of 3D models constructed using software such as computer aided design (CAD) etc. into a plurality of continuously stacked thin (quasi-two-dimensional) cross-sectional layers. Accordingly, a printing module of a three dimensional printing apparatus usually moves along the XY plane above a printing platform according to the spatial coordinates XYZ constructed by the design data of the 3D model, such that the constructing material forms the correct cross-sectional layer shape. Then, through the printing module moving along the Z-axis in a layer-by-layer manner, the plurality of cross-sectional layers are gradually stacked along the Z-axis, such that the constructing material forms a three dimensional object under the layer-by-layer curing condition.

Currently, most of the three dimensional printing apparatuses using the above rapid molding method to form three dimensional objects use the printing head to heat and melt the molding material and to coat the molding material layer-by-layer onto the printing platform to form the three dimensional objects. Generally, the three dimensional printing apparatus first controls the printing head to print the peripheral profile of the three dimensional object, and then controls the printing head to further print the interior filler regions enclosed within the peripheral profile. However, when the three dimensional printing apparatus prints an object having an excessively small cross-sectional area, it may cause the peripheral profile to deform due to being extruded outward by the feed-material of the interior filler region printed next when the peripheral profile has not yet cured to a certain extent. In addition, when the three dimensional printing apparatus prints an object having an excessively small cross-sectional area, it may also very easily cause generation of a gap between the three dimensional object actually printed out and the expected result of users due to ambient temperature or other factors, thereby reducing the printing quality and printing yield of the three dimensional printing apparatus.

SUMMARY

In view of the above, the disclosure provides a three dimensional printing method and a three dimensional printing apparatus, which enhances printing quality of the three dimensional printing apparatus in printing a three dimensional object having a small cross-sectional area.

A three dimensional printing method configured to print a three dimensional object is provided, and the three dimensional printing method includes the following steps. Layer information of the three dimensional object is obtained, wherein the three dimensional object includes at least one layer object and the layer information includes a plurality of coordinate point locations of the at least one layer object. A geometry parameter is calculated according to the plurality of coordinate point locations, and whether the layer object includes at least one small-area object classified as small-area printing range is determined according to the geometry parameter. If the layer object includes the at least one small-area object classified as small-area printing range, a feed-material output amount associated with the small-area object is reduced; and a printing module is controlled to print the small-area object according to the reduced feed-material output amount.

From another aspect, a three dimensional printing apparatus configured to print a three dimensional object is provided, and the three dimensional printing apparatus includes a platform, a printing module, and a control unit. The platform includes a bearing surface, and the printing module is disposed above the platform and includes a printing head. The printing head is configured to move along a movement plane and move along a normal direction of the movement plane. The control unit is coupled to the platform and the printing head. The control unit controls the printing head to sequentially print at least one layer object of the three dimensional object, such that the layer object is sequentially stacked on the bearing surface. If the layer object includes at least one small-area object classified as small-area printing range, the control unit controls the printing module to reduce the feed-material output amount associated with the small-area object, such that the printing module prints the small-area object according to the reduced feed-material output amount.

Accordingly, in one of the embodiments, whether the layer object includes at least one small-area object classified as small-area printing range is determined according to the coordinate point locations of the layer object. When the presence of the small-area object is detected, to shorten the curing time of the closed profile of the small-area object, the feed-material output amount for printing the small-area object is correspondingly reduced. Alternatively, when the presence of the small-area object is detected, to prevent deformation of the small-area object caused by the high-temperature feed-material for printing the filler structure extruding to the peripheral closed profile, the feed-material output amount for printing the small-area object is correspondingly reduced. Thus, generation of a gap between the three dimensional object printed out and the expected result of users is prevented, and the printing quality of the three dimensional printing apparatus is enhanced.

To make the above and other features and advantages of the disclosure more comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments and, together with the description, serve to explain the principles of the disclosure.

DESCRIPTION OF THE EMBODIMENTS

Figure 1:
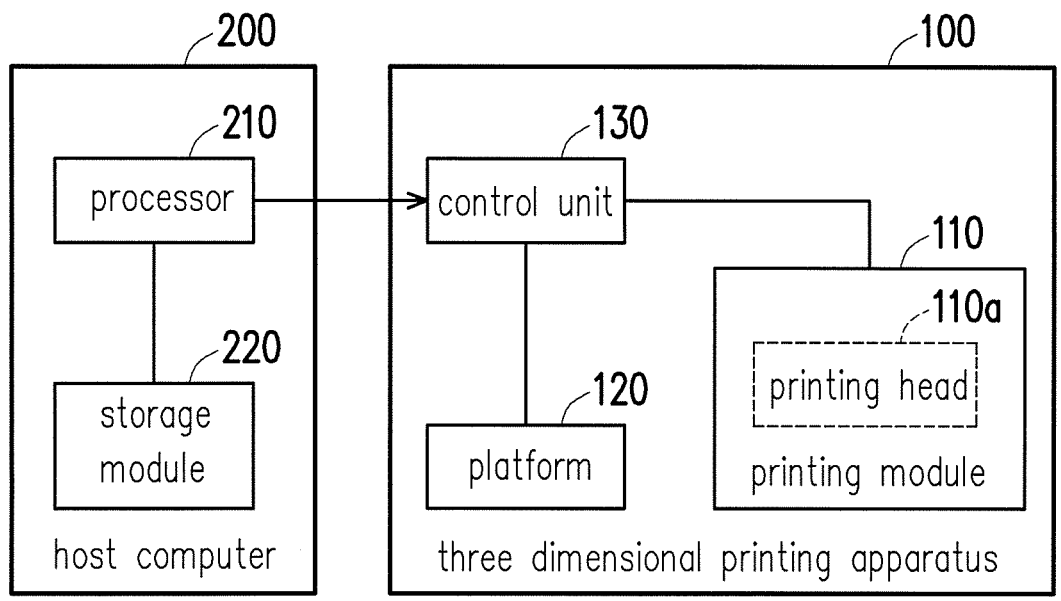
FIG. 1 is a schematic block diagram illustrating a three dimensional printing system according to one of the embodiments.

Reference will now be made in detail to the exemplary embodiments, examples of which are illustrated in the accompanying drawings. Wherever possible, the same reference numbers are used in the drawings and the description to refer to the same or like parts.

FIG. 1 is a schematic block diagram illustrating a work situation of a three dimensional printing system according to one of embodiment. Referring to FIG. 1, the three dimensional printing system 10 includes a three dimensional printing apparatus 100 and a host computer 200. The three dimensional printing apparatus 100 is configured to print out a three dimensional object according to a three dimensional model information. More specifically, the host computer 200 is an apparatus having computing functions, for example, a computer apparatus such as a notebook computer, a tablet computer, a desktop computer, etc., and the disclosure does not limit the types of the host computer 200. The host computer 200 edits and processes a three dimensional model and transmit the relevant three dimensional model information to the three dimensional printing apparatus 100, such that the three dimensional printing apparatus 100 prints out a three dimensional object according to the three dimensional model information. In the embodiment, the three dimensional model information can be a three dimensional digital image file, for example, constructed by the host computer 200 through computer-aided design (CAD) or animation modeling software, etc. In addition, the host computer 200 performs a layer processing to the three dimensional model to obtain the three dimensional model information associated with a plurality of layer objects, such that the three dimensional printing apparatus 100 sequentially prints out each layer object according to the corresponding three dimensional model information of the layer objects, so as to ultimately form the complete three dimensional object.

Still referring to FIG. 1, the three dimensional printing apparatus 100 is coupled to the host computer 200. The host computer 200 includes a processor 210 and a storage module 220. The processor 210 is, for example, a central processing unit (CPU), or other programmable general purpose or special purpose microprocessor, a digital signal processor (DSP), a programmable controller, application specific integrated circuits (ASIC), a programmable logic device (PLD) or other similar apparatus or a combination of these apparatuses, which should not be construed as a limitation to the disclosure.

The storage module 220 is, for example, any type of fixed or portable random access memory (RAM), read-only memory (ROM), flash memory, hard disk, or other similar apparatus or a combination of these apparatuses. The storage module 220 stores a plurality of commands and/or programs, and the commands and the programs are loaded and executed by the processor 210, so as to edit and process the three dimensional model or to perform the layer processing to the three dimensional model.

It is worth noting that the three dimensional model information is generated through further performing compilation and calculation to the three dimensional model, wherein the three dimensional model information is readable by the three dimensional printing apparatus 100 and the three dimensional printing apparatus 100 executes printing function accordingly. More specifically, the processor 210 of the host computer 200 first performs the layer processing to the three dimensional model to generate the plurality of layer objects of the three dimensional model. Generally, the processor 210 slices the three dimensional model using the layer planes at fixed intervals so as to extract cross-sectional profiles of the layer objects.

The processor 210 further generates a corresponding control code file according to the cross-sectional profile of each layer object. Here, the control code file is the three dimensional model information, wherein the three dimensional model information is readable by the three dimensional printing apparatus 100 and the three dimensional printing apparatus 100 executes printing function accordingly. In other words, a control unit 130 of the three dimensional printing apparatus 100 controls components of the three dimensional printing apparatus 100 according to the control code file, thereby forming each layer object on a platform in a layer-by-layer manner. In an embodiment, the control code file is, for example, a G code file.

Figure 2:
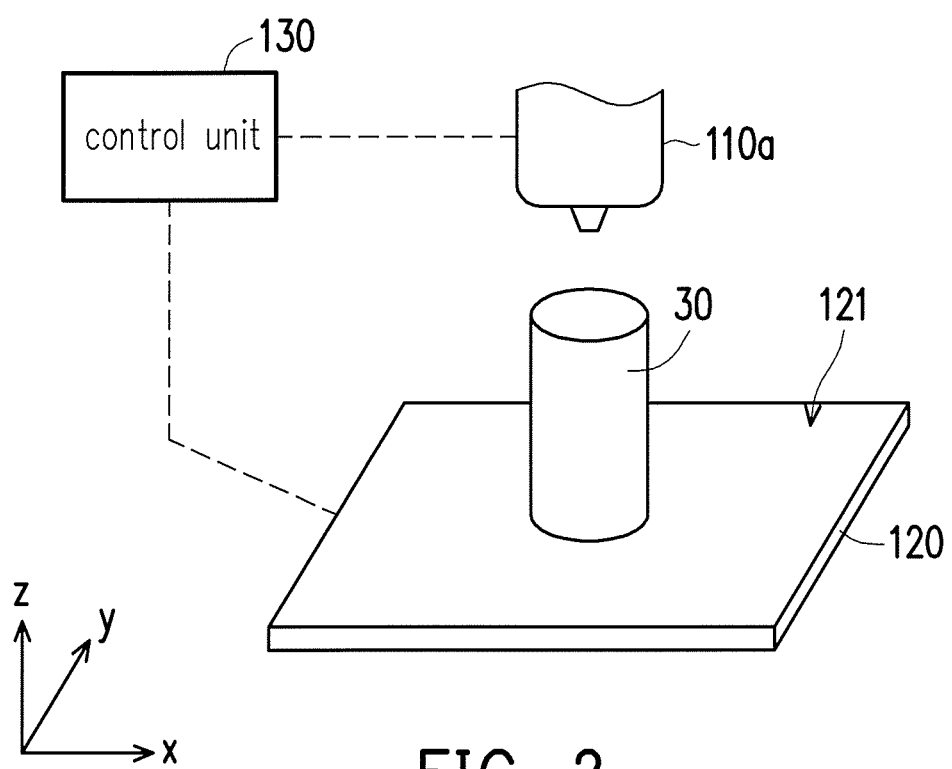
FIG. 2 is a schematic diagram illustrating a three dimensional printing apparatus according to one of the embodiments.

The three dimensional printing apparatus 100 is configured to print out the three dimensional object according to the three dimensional model information transmitted by the host computer 200. More specifically, the control unit 130 controls each portion of the three dimensional printing apparatus 100 according to the three dimensional model information, so as to repeatedly print a molding material at a specific position until the entire three dimensional object is generated. FIG. 2 is a schematic diagram illustrating a three dimensional printing apparatus according to one of embodiments. Referring to FIG. 1 and FIG. 2 simultaneously, in the embodiment, the three dimensional printing apparatus 100 includes a printing module 110, a platform 120, and a control unit 130. Here, the Cartesian coordinate system is provided at the same time so as to facilitate explanation of relevant components and motion status thereof. The platform 120 includes a bearing surface 121. The printing module 110 is disposed above the platform 120 and includes a printing head 110a configured to move along the XY plane and move along a normal direction (Z-axis) of the XY plane, so as to print each layer object on the bearing surface 121 in a layer-by-layer manner to gradually form the three dimensional object 30.

More specifically, in the embodiment, the molding material forming the three dimensional object 30 can be various suitable materials suitable for manufacturing methods such as fused filament fabrication (FFF) or melted and extrusion modeling, etc. For example, the molding material can be a thermofusible wire suitable for fused filament fabrication, and the molding material is heated, for example, through the printing head 110a, so as to melt the molding material delivered to the printing head 110a into a fluid material presenting a molten state. Then, the molding material in the high-temperature molten state is extruded through the printing head 110a. Thus, the molding material in the molten state is cured on the bearing surface 121 in a layer-by-layer manner to form the three dimensional object 30.

In addition, the control unit 130 is coupled to the printing head 110a and the platform 120, reads the three dimensional model information, and controls the overall operation of the three dimensional printing apparatus 100 according to the three dimensional model information to print out the three dimensional object 30. For example, the control unit 130 controls a movement path of the printing head 110a or controls a feed-material output amount of the molding material extruded by the printing head 110a according to the three dimensional model information. The control unit 130 is, for example, an equipment having computing functions, such as a central processing unit, a chipset, a microprocessor, an embedded controller, etc., which should not be construed as a limitation.

It is worth noting that in the embodiment, layer information of every layer object includes a profile path information and a filler path information. After the control unit 130 first controls the printing module 110 to print a closed profile structure of the layer object according to the profile path information, the control unit 130 then controls the printing module 110 to print a filler structure of the layer object according to the filler path information. A pattern of the filler structure, for example, presents a honeycomb shape, but the disclosure is not limited thereto, and the pattern of the filler structure can depend on actual application and needs. Alternatively, the pattern of the filler structure of every layer object can be a stripe shape, but a stripe direction of the filler structure of different layer objects can be the same or different.

In an embodiment, if a layer object includes at least one small-area object classified as small-area printing range, the control unit 130 controls the printing module 110 to reduce a feed-material output amount for printing the small-area object, such that the printing module 110 prints the small-area object according to the reduced feed-material output amount. In brief, during the period that the three dimensional printing apparatus 100 prints the small-area object, the three dimensional printing apparatus 100 automatically decreases the feed-material output amount for printing the small-area object and prints the small-area object according to the less feed-material output amount. Thus, a curing time of the closed profile structure of the small-area object is shortened, which is able to accelerate the curing of the closed profile structure of the small-area object. In addition, when printing the filler structure, since the feed-material output amount is reduced, a poor printing result caused by the high-temperature molten feed-material stretching open the closed profile structure which is a cured periphery of the layer object can be prevented. It is also worth noting that the feed-material output amount is a feed-material amount extruded by the printing head 100a for printing the unit length.

On the other hand, if the layer object does not include a small-area object classified as the small-area printing range, the control unit 130 maintains the feed-material output amount associated with the layer object at a predetermined value, so as to control the printing module 110 to print the layer object according to the predetermined value.

In an embodiment, a layer object includes at least one partial object, and the partial objects are not connected to each other when amount of the at least one partial object is more than one. More specifically, the shape and profile of the layer object on the XY plane depends on the shape of the three dimensional object. Therefore, the layer object can include a plurality of partial objects, whose height of the Z-axis is the same, belonging to the same layer but not connected to each other. A profile path length of the small-area object classified as small-area printing range among the partial objects is less than a length threshold value. The length threshold value depends on the actual application situation and needs and is, for example, 6 mm, 8 mm, or 1 cm, etc, which should not be construed as a limitation to the disclosure. Alternatively, a cross-sectional area of the small-area object classified as small-area printing range in the partial objects is less than an area threshold value. The area threshold value depends on the actual application situation and needs and is, for example, 4 $mm^2$ or 6 $mm^2$, etc, which should not be construed as a limitation to the disclosure.

It is worth noting that the small-area object includes a closed profile structure and a filler structure. In an embodiment, if a geometry parameter corresponding to the small-area object is less than a threshold value, the printing module 110 may not print the filler structure of the small-area object. More specifically, the geometry parameter can be the cross-sectional area or the profile path length of the partial object and the geometry parameter is used for distinguishing whether the partial object is classified as small-area printing range. In other words, when the geometry parameter corresponding to the small-area object is less than the threshold value, the printing module 110 only prints the closed profile structure of the small-area object.

Figure 3:
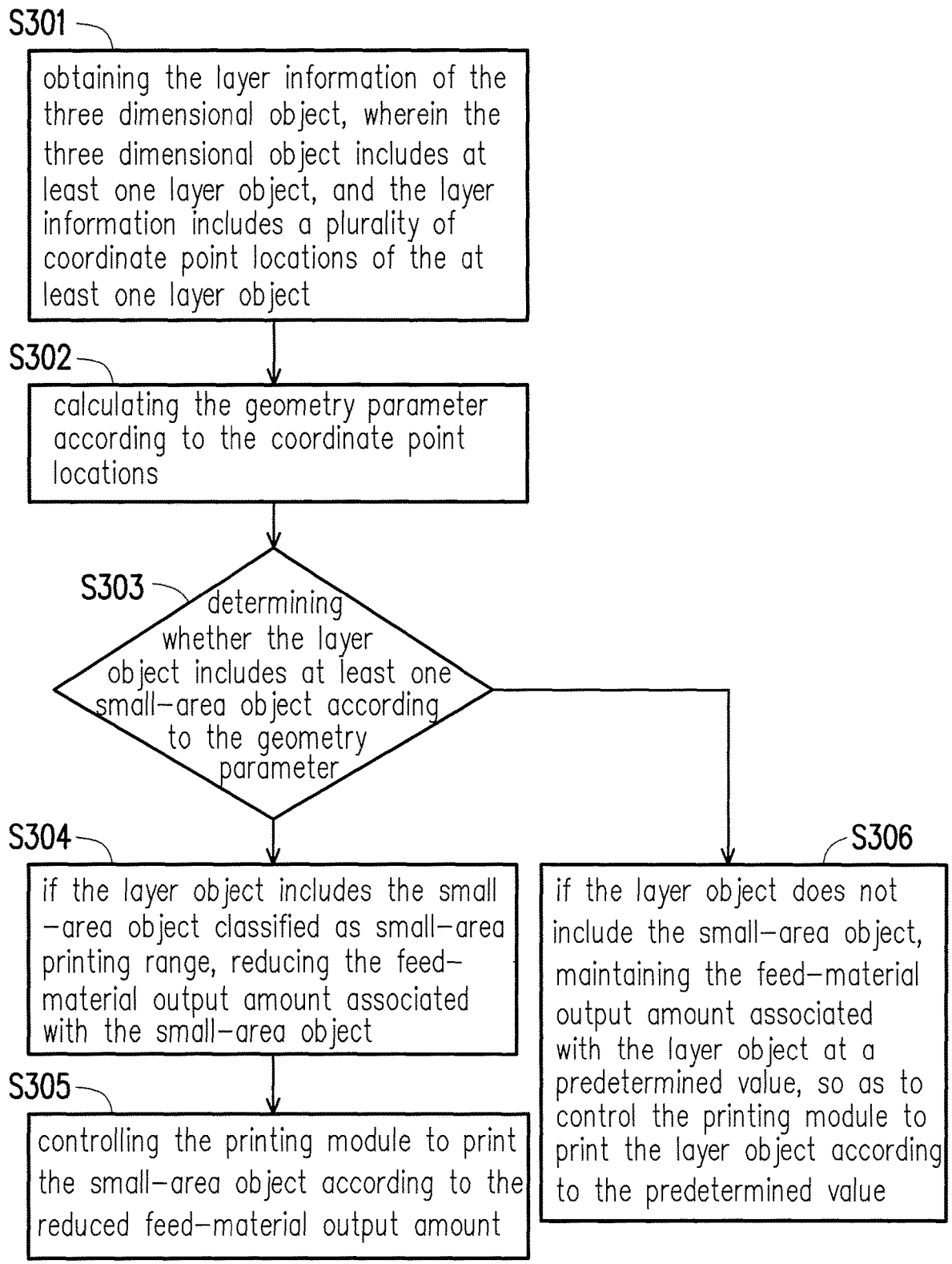
FIG. 3 is a flow diagram illustrating a three dimensional printing method according to one of the embodiments.

FIG. 3 is a flow diagram illustrating a three dimensional printing method according to one of embodiments. The method of the embodiment is suitable for the three dimensional printing system 10 of FIG. 1. The following paragraphs explain detailed steps of the three dimensional printing method of the embodiment with each component in the three dimensional printing system 10.

In step S301, the processor 210 obtains the layer information of the three dimensional object, wherein the three dimensional object includes at least one layer object, and the layer information includes a plurality of coordinate point locations of the layer object. More specifically, after the processor 210 obtains the three dimensional model of the three dimensional object, the processor 210 performs the layer processing to the three dimensional model to obtain the layer objects corresponding to different printing heights. Thus, the processor 210 obtains the layer information of each layer object, wherein the layer information includes the profile path information and the filler path information. The profile path information includes the plurality of coordinate point locations associated with the layer object. The three dimensional printing apparatus 100 prints out the closed profile structure of the layer object according to the coordinate point locations regarding the cross-sectional profile of the layer information. Every coordinate point location respectively includes at least a first vector coordinate value and a second vector coordinate value. More specifically, the coordinate point locations regarding the cross-sectional profile in the layer information can represent a location and shape of the layer object on the XY plane and includes an X vector coordinate value and a Y vector coordinate value.

In step S302, the processor 210 calculates the geometry parameter according to the coordinate point locations. Then, in step S303, the processor 210 determines whether the layer object includes at least one small-area object classified as small-area printing range according to the geometry parameter. More specifically, by calculating the geometry parameter of the layer object, whether the printing head 110a only moves in a small range on the movement plane (the XY plane) when printing the layer objects can be determined in advance. In an embodiment, the geometry parameter calculated according to the coordinate point locations associated with the cross-sectional profile can be the profile path length or the cross-sectional area.

For example, the processor 210 calculates the profile path length of the at least one partial object of the layer object according to the coordinate point locations. The processor 210 further determines whether the partial object is classified as small-area printing range according to whether the profile path length is less than the length threshold value, so as to determine whether the layer object includes the small-area object classified as small-area printing range. In brief, when the profile path length of the partial object is too small (less than the length threshold value), the processor 210 labels the partial object as the small-area object, so as to perform additional adjustment to the feed-material output amount for printing the small-area object.

Figure 4:
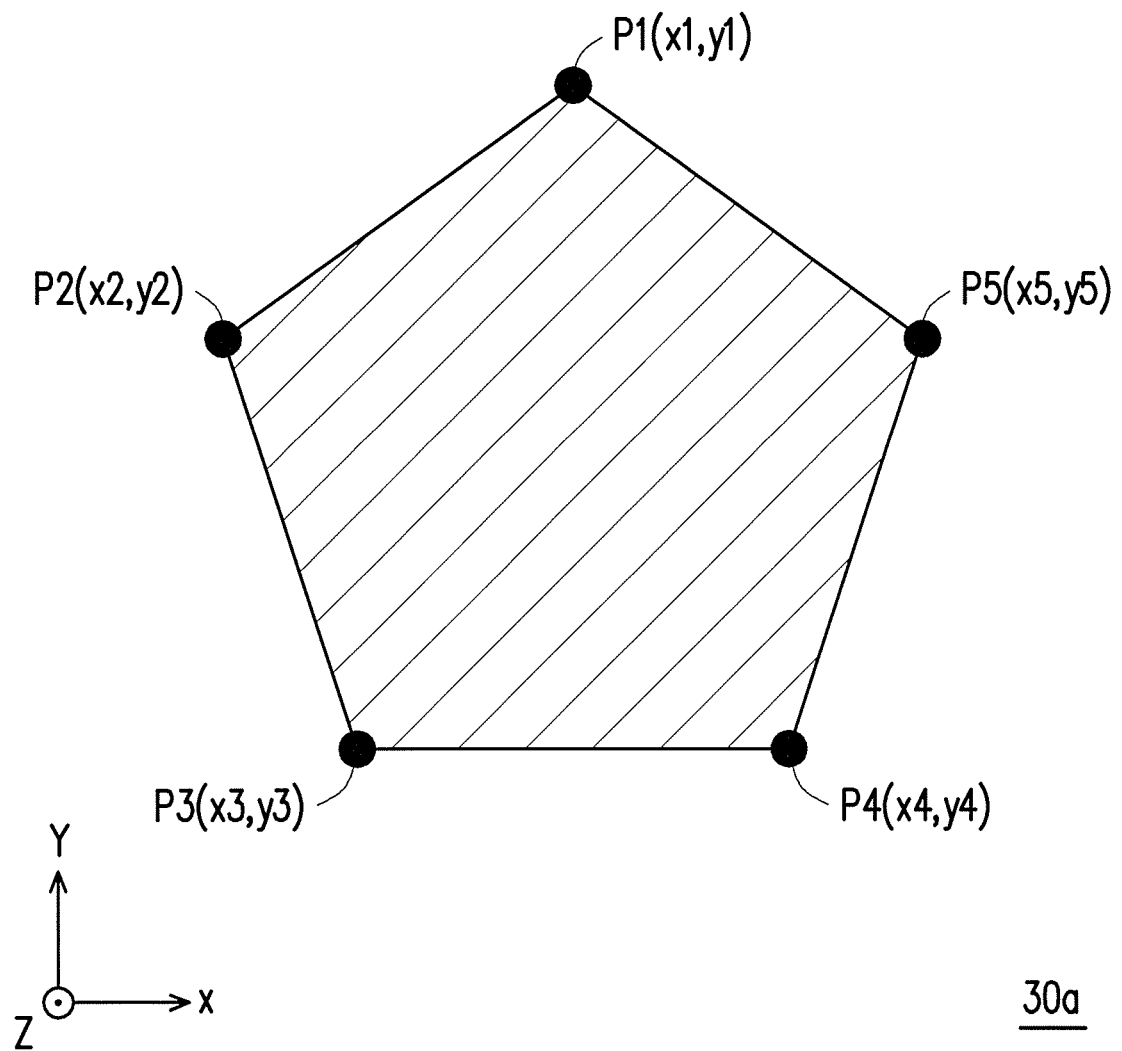
FIG. 4 is an exemplary schematic diagram illustrating a cross-section of a small-area object on the XY plane according to one of the embodiments.

FIG. 4 is an exemplary schematic diagram illustrating a cross-section of a small-area object on the XY plane according to one of embodiments. Referring to FIG. 4, the layer information of a layer object 30*a* includes coordinate point locations P1 to P5 associated with the cross-sectional profile and having a printing order. Suppose the coordinate value of the coordinate point location P1 on the XY plane is $(x_1, y_1)$, the coordinate value of the coordinate point location P2 on the XY plane is $(x_2, y_2)$, the coordinate value of the coordinate point location P3 on the XY plane is $(x_3, y_3)$, the coordinate value of the coordinate point location P4 on the XY plane is $(x_4, y_4)$, and the coordinate value of the coordinate point location P5 on the XY plane is $(x_5, y_5)$. The profile path length Lth of the layer object 30*a* can be obtained according to Formula (1).

$$Lth = \sum_{i=1}^{4} \left[ ((x_i - x_{(i+1)})^2 + (y_i - y_{(i+1)})^2)^{0.5} \right] + ((x_5 - x_0)^2 + (y_5 - y_0)^2)^{0.5} \quad (1)$$

Although the example shown in FIG. 4 and Formula (1) is described with only 5 coordinate point locations, the disclosure is not limited thereto. People having ordinary skill in the art can apply Formula (1) to other examples having a different number of coordinate locations according to the above description. Thus, the processor 210 determines whether the layer object includes the small-area object according to the calculated profile path length and length threshold value.

In another example, the processor 210 calculates the cross-sectional area of the at least one partial object of the layer object according to the coordinate point locations. The processor 210 further determines whether the partial object is classified as small-area printing range according to whether the cross-sectional area is less than the area threshold value, so as to determine whether the layer object includes the small-area object classified as small-area printing range. In brief, when the cross-sectional area of the partial object is too small (less than the area threshold value), the processor 210 labels the partial object as the small-area object, so as to perform additional adjustment to the feed-material output amount for printing the small-area object.

Referring to FIG. 4 again, the cross-sectional area A of the layer object 30*a* can be obtained according to Formula (2).

$$A = 0.5 \left| \sum_{i=1}^{4} \{((x_i * y_{(i+1)}) - (x_{(i+1)} * y_i))\} + ((x_5 * y_0) - (x_0 * y_5)) \right| \quad (2)$$

Although the example shown in FIG. 4 and Formula (2) is described with only 5 coordinate point locations, the disclosure is not limited thereto. People having ordinary skill in the art can apply Formula (2) to other examples having a different number of coordinate locations according to the above description. Thus, the processor 210 determines whether the layer object includes the small-area object according to the calculated cross-sectional area and area threshold value.

In step S304, if the layer object includes a small-area object classified as small-area printing range, the processor 210 reduces the feed-material output amount associated with the small-area object. In an embodiment, the processor 210 prints the small-area object according to the reduced feed-material output amount by adjusting a feed-material coating width of a printing path, wherein the feed-material coating width narrows as the feed-material output amount is reduced. More specifically, by adjusting printing parameter corresponding to each portion of the printing module 110, the printing module 110 modifies the feed-material output amount for printing accordingly. More specifically, the printing head 110*a* melts the molding material and coats the molding material in the molten state on the bearing surface 121. Thus, according to the temperature of the printing head 110*a*, the material-feeding speed of the feed-material roller and other printing components status, the printing head 110*a* coats the molding material in the molten state on the bearing surface 121 according to the feed-material coating width corresponding to the said printing components status. The feed-material coating width is a molding width of the molding material on a single printing path. Alternatively, the processor 210 reduces the feed-material output amount for printing the small-area object by adjusting the feed-material amount required by the unit length path.

Furthermore, in an embodiment, the processor 210 decides a reduction proportion according to the geometry parameter corresponding to the small-area object so as to reduce the feed-material output amount associated with the small-area object according to the reduction proportion. In an embodiment, if the geometry parameter corresponding to the small-area object is less than the threshold value, the processor 210 sets the feed-material output amount of the filler structure of the small-area object as zero. For example, the area threshold value includes a first threshold value TH1, a second threshold value TH2, and a third threshold value TH3, wherein the first threshold value TH1>the second threshold value TH2>the third threshold value TH3. When the cross-sectional area of the small-area object is between the first threshold value TH1 and the second threshold value TH2, the feed-material output amount associated with the small-area object is reduced to eighty percent of a predetermined value. When the cross-sectional area of the small-area object is between the second threshold value TH2 and the third threshold value TH3, the feed-material output amount associated with the small-area object is reduced to forty percent of the predetermined value. When the cross-sectional area of the small-area object is less than the third threshold value TH3, the feed-material output amount for printing the filler structure of the small-area object is set as zero.

Afterwards, in step S305, the processor 210 controls the printing module 110 to print the small-area object according to the reduced feed-material output amount. In another aspect, in step S306, if the layer object does not include the small-area object classified as small-area printing range, the processor 210 maintains the feed-material output amount associated with the layer object at a predetermined value, so as to control the printing module 110 to print the layer object according to the predetermined value. The molding material of the layer object is allowed to have sufficient time to cure to a certain extent, so as to prevent occurrence of the situation that the three dimensional object is not as expected due to continuously stacking molding material not yet cured to a certain extent. In other words, before the printing head 110a moves to the next location on the Z-axis and prints another layer object, the molding material on the bearing surface 121 have all cured to a certain extent.

It is worth noting that although the embodiment uses the processor 210 of the host computer 200 executing steps S301 to 306 as an example, in another embodiment, steps S301 to 306 can be executed by the control unit 130 of the three dimensional printing apparatus 100. More specifically, the control unit 130 obtains control code of a plurality of layer objects from the host computer 200 and obtains the layer information of the layer object according to the control code. Similarly, after the control unit 130 obtains the layer information of the layer object, the control unit 130 executes steps S301 to S306 to adjust the feed-material output amount of the small-area object and control other printing components of the three dimensional printing apparatus 100 to execute three dimensional printing function according to the adjusted feed-material output amount. More specifically, in an embodiment, the printing module 110 further includes a temperature controller and a feed-material roller. The feed-material roller feeds the solid molding material into the printing head 110a through rotation to perform melting, and the temperature controller adjusts the temperature of the printing head 110a. Thus, if the layer object includes the small-area object classified as small-area printing range, the control unit 130 controls the temperature controller to lower the temperature of the printing head 110a, such that the printing module 110 prints the small-area object according to the reduced feed-material output amount. Alternatively, if the layer object includes the small-area object classified as small-area printing range, the control unit 130 lowers the material-feeding speed of the feed-material roller, such that the printing module 110 prints the small-area object according to the reduced feed-material output amount.

In summary of the above, in the embodiments of the disclosure, during the period that the three dimensional printing apparatus prints the small-area object with the small cross-sectional area, the three dimensional printing apparatus prints the closed profile structure and filler structure of the small-area object according to the less feed-material output amount. Thus, since the feed-material amount forming the closed profile structure is reduced, the closed profile structure of the layer object having the small cross-sectional area is allowed to have sufficient curing time to cure to a certain extent, so as to prevent deformation caused by the filler structure printed later extruding to the closed profile structure, thereby enhancing the printing quality of the three dimensional printing apparatus. Furthermore, in one of the embodiments, the reduction proportion of the feed-material output amount can be decided based on the geometry parameter of the small-area object, so as to adaptively select the most appropriate feed-material output amount for different printing area.

Although the present disclosure has been described with reference to the above embodiments, it will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three dimensional printing method configured to print a three dimensional object according to a three dimensional model information, comprising:
   obtaining layer information of the three dimensional object from the three dimensional model information, wherein the three dimensional object comprises at least one layer object and the layer information comprises a plurality of coordinate point locations of the at least one layer object, wherein the three dimensional object is a main body of a final product to be printed according to the three dimensional model information;
   calculating a geometry parameter according to the plurality of coordinate point locations of the at least one layer object, the calculated geometry parameter is a profile path length or a cross-sectional area;
   determining that the at least one layer object comprises at least one small-area object classified as a small-area printing range when the calculated profile path length is less than a length threshold value, or the calculated cross-sectional area is less than an area size threshold value;
   in response to determining that the at least one layer object comprises the at least one small-area object classified as the small-area printing range, reducing a feed-material output amount associated with the at least one small-area object; and
   controlling a printing module that has only one printing head to print the at least one small-area object according to the reduced feed-material output amount.

2. The three dimensional printing method according to claim 1, wherein the step of calculating the geometry parameter according to the plurality of coordinate point locations of the at least one layer object comprises:
   calculating the calculated profile path length of at least one partial object of the at least one layer object according to the plurality of coordinate point locations, wherein the partial objects are not connected to each other when amount of the at least one partial object is more than one.

3. The three dimensional printing method according to claim 1, wherein the step of calculating the geometry parameter according to the plurality of coordinate point locations of the at least one layer object comprises:
   calculating the calculated cross-sectional area of at least one partial object of the at least one layer object according to the plurality of coordinate point locations, wherein the partial objects are not connected to each other when amount of the at least one partial object is more than one.

4. The three dimensional printing method according to claim 1, further comprising:
   in response to determining that the at least one layer object does not include the at least one small-area object, maintaining the feed-material output amount associated with the at least one layer object at a predetermined value, so as to control the printing module to print the at least one layer object according to the predetermined value.

5. The three dimensional printing method according to claim 1, wherein the step of in response to determining that the at least one layer object comprises the at least one small-area object, reducing the feed-material output amount associated with the at least one small-area object comprises:

deciding a reduction proportion according to the geometry parameter corresponding to the at least one small-area object, so as to reduce the feed-material output amount associated with the at least one small-area object according to the reduction proportion.

6. The three dimensional printing method according to claim 1, wherein the at least one small-area object comprises a closed profile structure and a filler structure, and the step of reducing the feed-material output amount associated with the at least one small-area object comprises:

reducing the feed-material output amount of the filler structure of the at least one small-area object.

7. The three dimensional printing method according to claim 1, wherein each of the plurality of coordinate point locations respectively comprises a first vector coordinate value and a second vector coordinate value.

8. The three dimensional printing method according to claim 1, wherein the step of controlling the printing module to print the at least one small-area object according to the reduced feed-material output amount comprises:

printing the at least one small-area object according to the reduced feed-material output amount by adjusting a feed-material coating width of a printing path, wherein the feed-material coating width narrows as the feed-material output amount is reduced.

9. The three dimensional printing method according to claim 1, wherein the feed-material output amount is a feed-material amount extruded for printing a unit length.

10. The three dimensional printing method according to claim 1, wherein the feed-material output amount is fused filament extruded for printing a unit length.

11. The three dimensional printing method according to claim 1, wherein and the at least one small-area object is an independent object separated from the rest object of the same layer if the at least one layer object comprises more than one object.

12. The three dimensional printing method according to claim 1, wherein the at least one small-area object comprises a complete close outer contour.

13. The three dimensional printing method according to claim 1, wherein the step of reducing a feed-material output amount associated with the at least one small-area object comprises reducing a feed-material output amount associated with a closed profile structure or a filler structure of the small-area object.

* * * * *